US012054795B2

(12) United States Patent
Chang et al.

(10) Patent No.: US 12,054,795 B2
(45) Date of Patent: Aug. 6, 2024

(54) SYSTEM AND METHOD FOR DELIVERING FLUIDIZED POWDER BASED ON FLUE GAS CARRYING WASTE SLAG AND INSTANT COOLING STEEL SLAG

(71) Applicants: SHANDONG UNIVERSITY, Shandong (CN); QINGDAO DANENG ENVIRONMENTAL PROTECTION EQUIPMENT CO., LTD., Shandong (CN); QINGDA LOW CARBON GREEN HYDROGEN INDUSTRIAL TECHNOLOGY RESEARCH INSTITUTE (QINGDAO) CO., LTD., Shandong (CN)

(72) Inventors: Jingcai Chang, Qingdao (CN); Yong Wang, Qingdao (CN); Chunyuan Ma, Qingdao (CN); Lianhai Zhang, Qingdao (CN); Shusheng Li, Qingdao (CN); Rui Wang, Qingdao (CN); Jinglan Hong, Qingdao (CN); Jiahao Zhang, Qingdao (CN)

(73) Assignees: SHANDONG UNIVERSITY, Qingdao (CN); QINGDAO DANENG ENVIRONMENTAL PROTECTION EQUIPMENT CO., LTD., Qingdao (CN); QINGDA LOW CARBON GREEN HYDROGEN INDUSTRIAL TECHNOLOGY RESEARCH INSTITUTE (QINGDAO) CO., LTD., Qingdao (CN)

( * ) Notice: Subject to any disclaimer, the term of this patent is extended or adjusted under 35 U.S.C. 154(b) by 0 days.

(21) Appl. No.: 18/284,415
(22) PCT Filed: Nov. 29, 2022
(86) PCT No.: PCT/CN2022/135074
§ 371 (c)(1),
(2) Date: Sep. 27, 2023
(87) PCT Pub. No.: WO2024/060402
PCT Pub. Date: Mar. 28, 2024

(65) Prior Publication Data
US 2024/0102118 A1 Mar. 28, 2024

(30) Foreign Application Priority Data
Sep. 22, 2022 (CN) .......................... 202211156217.2

(51) Int. Cl.
C21B 3/08 (2006.01)
G01N 1/00 (2006.01)

(52) U.S. Cl.
CPC ............ *C21B 3/08* (2013.01); *C21B 2200/00* (2013.01); *C21B 2400/062* (2018.08); *G01N 2001/002* (2013.01)

(58) Field of Classification Search
CPC .. B65G 2203/042; B65G 53/16; B65G 53/18; B65G 53/20; B65G 53/66; C21B 3/08;
(Continued)

(56) References Cited

U.S. PATENT DOCUMENTS

2017/0260465 A1 9/2017 Soda et al.
2021/0347665 A1* 11/2021 Wang ...................... F26B 11/02

FOREIGN PATENT DOCUMENTS

CN 203700451 U 7/2014
CN 204824761 U 12/2015
(Continued)

OTHER PUBLICATIONS

Yi-long QI; "New Equipment and Process for the Treatment of Off-gas from the Slag Granulation Operation;" Hunan Nonferrous Metals; 2016; pp. 68-70, 80.; vol. 32, No. 2.
(Continued)

Primary Examiner — Mi'Schita' Henson
(74) Attorney, Agent, or Firm — Oliff PLC

(57) ABSTRACT

A system and method deliver fluidized powder based on flue gas carrying waste slag and instant cooling steel slag. A first flue gas pipeline receives pressurized $CO_2$-rich flue gas and in fluid communication with a fluidization air pipeline, a
(Continued)

pressurization air pipeline and a supplementary air pipeline respectively and through them enters an upper discharge bin; a second flue gas pipeline receives the pressurized $CO_2$-rich flue gas and in fluid communication with a gas-gas mixer, a dense phase discharge guide pipe first end extends into the upper discharge bin and receives high-pressure dense phase gas-powder flow of $CO_2$-rich flue gas, and a dense phase discharge guide pipe second end is connected to the gas-gas mixer; a variable-pitch twin screw sealed conveyor discharge end extends into an upper discharge bin internal space, and is provided with an upwardly inclined gas-blocking segment.

10 Claims, 1 Drawing Sheet

(58) Field of Classification Search
CPC .......... C21B 2200/00; C21B 2400/062; C21B 2400/026; C21B 2400/08; G01N 2001/002
See application file for complete search history.

(56) References Cited

FOREIGN PATENT DOCUMENTS

| CN | 107287370 | A | | 10/2017 | |
| CN | 206580299 | U | | 10/2017 | |
| CN | 109207659 | A | * | 1/2019 | .............. C21B 3/06 |
| CN | 109207659 | A | | 1/2019 | |
| CN | 109226185 | A | | 1/2019 | |
| CN | 210162782 | U | | 3/2020 | |
| CN | 111270026 | A | | 6/2020 | |
| CN | 111471817 | A | | 7/2020 | |
| CN | 111686904 | A | | 9/2020 | |
| CN | 111795547 | A | | 10/2020 | |
| CN | 111947127 | A | | 11/2020 | |
| CN | 112146446 | A | | 12/2020 | |
| CN | 212923525 | U | | 4/2021 | |
| CN | 112899420 | A | | 6/2021 | |
| CN | 213504855 | U | | 6/2021 | |
| CN | 114890691 | A | | 8/2022 | |
| CN | 115231316 | A | | 10/2022 | |
| DE | 10 2008 056 076 | A1 | | 5/2010 | |
| JP | 2001-241861 | A | | 9/2001 | |
| JP | 2009-227495 | A | | 10/2009 | |
| WO | 2019/156277 | A1 | | 8/2019 | |
| WO | 2021/109328 | A1 | | 6/2021 | |

OTHER PUBLICATIONS

Wang et al.; "Experimental investigation on granulation characteristics and waste heat recovery of molten slag in gas quenching dry granulation technique;" Applied Thermal Engineering; 2020; pp. 1-14.

Nov. 1, 2022 Office Action and Search Report issued in Chinese Patent Application No. 202211156217.2.

Jun. 3, 2023 Search Report issued in International Patent Application No. PCT/CN2022/135074.

Jun. 3, 2023 Written Opinion of the International Searching Authority issued in International Patent Application No. PCT/CN2022/135074.

* cited by examiner

SYSTEM AND METHOD FOR DELIVERING FLUIDIZED POWDER BASED ON FLUE GAS CARRYING WASTE SLAG AND INSTANT COOLING STEEL SLAG

The present invention claims priority of a Chinese patent application with the application number of 202211156217.2 and the title of "System and method for delivering fluidized powder based on flue gas carrying waste slag and instant cooling steel slag", which was filed with the Chinese Patent Office on Sep. 22, 2022, and the entire contents of which are incorporated herein by reference and form a part of this invention.

TECHNICAL FIELD

The present invention relates to the field of workshop conveyor systems and pneumatic pipeline conveying technology, and particularly relates to a system and method for delivering fluidized powder based on flue gas carrying waste slag and instant cooling steel slag.

BACKGROUND

Any discussion of the prior art throughout the specification should not be considered as an admission that such prior art is widely known or forms part of common general knowledge in the field.

With the implementation of carbon emission reduction policies, cement production is compressed, basalt mining is restricted, fly ash is reduced, building materials and transportation raw materials urgently need to increase income and reduce expenditure, and bulk steel slag solid waste welcomes new development opportunities.

At present, the main bottlenecks for the high-value utilization of steel slag are comprising: (1) the poor stability of steel slag, which contains free calcium oxide (f-CaO) and free magnesium oxide (f-MgO) that can form alkaline compounds when exposed to water, resulting in poor stability and volume stability when used as addition to cement, etc.; (2) the low cementitious activity of steel slag, which contains 2030% of $FeO_x$ that has almost no cementitious activity, and although $C_3S$ and $C_2S$ have cementitious activity, their relative content is reduced and their crystals are well-developed and have few defects; (3) the existing mainstream water quenching technology, which uses a large amount of water (0.8 tons to 1.2 tons of water per ton of slag) to rapidly cool the steel slag, produces hot water or steam with low heat medium quality (generally <100° C.) and contains a lot of particulate impurities and suspended solids, has poor quality, and the heat recovery rate is very unsatisfactory.

The inventors found that the water consumption of the wind quenching or the technology of granulating steel slag using $CO_2$-rich flue gas was greatly reduced, the total heat recovery rate was high, the waste heat could be used for power generation and the subsequent drying cost of the quenched slag products was saved, which met the strategic needs of high-quality development of the steel industry. Patent No. 202110062908.5 disclosed a device and method for combined quenching, alkali removal and magnetic heat recovery treatment of converter slag, which coordinated the "slag, iron, heat" resource utilization, and the quality of the quenched slag products was greatly improved, with a broad market space.

However, the inventor found in the actual operation of the above equipment that there are still problems such as large flue gas consumption and high operating cost of high pressure, etc., which still have a large gap compared with the operating cost of water quenching slag technology.

SUMMARY

To solve the shortcomings of the prior art, the present invention provides a system and method for delivering fluidized powder based on flue gas carrying waste slag and instant cooling steel slag, which reduces the operating consumption of cold source, produces higher quality and more active quenched slag products in the process of reducing the particle size of quenched slag products, and further reduces the cost.

To realize the above purpose, the present invention adopts the following technical solution:

In a first aspect of the present invention, there provided a system for delivering fluidized powder based on flue gas carrying waste slag and instant cooling steel slag.

a system for delivering fluidized powder based on flue gas carrying waste slag and instant cooling steel slag, comprising at least: a twin-screw waste slag powder conveyor, a first flue gas pipeline, a second flue gas pipeline, an upper discharge bin, a steel slag powder bin and a device for combined quenching, alkali removal and magnetic heat recovery treatment of converter slag;

a first end of the first flue gas pipeline is configured to receive pressurized $CO_2$-rich flue gas, a second end of the first flue gas pipeline is in fluid communication with a fluidization air pipeline, a pressurization air pipeline and a supplementary air pipeline respectively, the fluidization air pipeline, the pressurization air pipeline and the supplementary air pipeline are in fluid communication with the upper discharge bin respectively;

a first end of the second flue gas pipeline is configured to receive pressurized $CO_2$-rich flue gas, a second end of the second flue gas pipeline is in fluid communication with a gas-gas mixer, a first end of a dense phase discharge guide pipe is configured to extend into the upper discharge bin to receive high-pressure dense phase gas-powder flow of $CO_2$-rich flue gas, and a second end of the dense phase discharge guide pipe is in fluid communication with the gas-gas mixer;

the gas-gas mixer is in fluid communication with a secondary mixer; the secondary mixer is in fluid communication with a steel slag powder bin and a device for combined quenching, alkali removal and magnetic heat recovery treatment of converter slag; a feeding end of a variable-pitch twin screw sealed conveyor is configured to receive steel slag powder from a discharge end of the steel slag powder bin; a discharge end of the variable-pitch twin screw sealed conveyor is configured to extend into an internal space of the upper discharge bin; the discharge end of the variable-pitch twin screw sealed conveyor is equipped with an upwardly inclined gas-blocking segment, and an inside bottom of the upper discharge bin is provided with a bin fluidizer.

As an optional embodiment, the steel slag powder bin is provided with a discharge weighing signal collector, a support frame of the upper discharge bin is connected to a weighing meter, the weighing meter is connected to a weighing signal collector of the upper discharge bin, the discharge weighing signal collector and the weighing signal collector of the upper discharge bin are both in communication connection with a control terminal.

As an optional embodiment, a communication pipeline between the dense phase discharge guide pipe and the gas-gas mixer is provided with at least one first visual observation window.

As an optional embodiment, a communication pipeline between the secondary mixer and the steel slag powder bin and the device for combined quenching, alkali removal and magnetic heat recovery treatment of converter slag is provided with at least one second visual observation window.

As an optional embodiment, a top of the steel slag powder bin and the device for combined quenching, alkali removal and magnetic heat recovery treatment of converter slag is provided with a liquid steel slag trough; a double-layer air jet magnetic separation conveyor is configured to receive a quenched slag product output from the steel slag powder bin and a discharge port of the device for combined quenching, alkali removal and magnetic heat recovery treatment of converter slag.

As an optional embodiment, a top of the upper discharge bin is opened with a through hole in communication with a vent line, the vent line is provided with a vent valve in communication with the control terminal, each pipeline is provided with pressure sensors, flowmeters, and electric valves.

As an optional embodiment, the fluidization air pipeline is in fluid communication with a bottom of the upper discharge bin, the pressurization air pipeline is in fluid communication with a top of the upper discharge bin, and the supplementary air pipeline is in fluid communication with a middle or near-middle position of the upper discharge bin.

In a second aspect of the present invention, there provided a method for delivering fluidized powder based on flue gas carrying waste slag and instant cooling steel slag.

A method for delivering fluidized powder based on flue gas carrying waste slag and instant cooling steel slag, using a system for delivering fluidized powder based on flue gas carrying waste slag and instant cooling steel slag according to the first aspect of the present invention, comprising the following processes:
  feeding waste slag powder that meets the requirements by a twin-screw sealed conveyor (e.g., a variable-pitch twin screw sealed conveyor); accumulating the waste slag powder at a gas-blocking segment and sealing a discharge end of the variable-pitch twin screw sealed conveyor; and falling the waste slag powder into an internal space of an upper discharge bin under the extrusion of rear materials;
  introducing pressurized $CO_2$-rich flue gas into the upper discharge bin via a first flue gas pipeline, a fluidization air pipeline, a pressurization air pipeline, and a supplementary air pipeline; fluidizing the waste slag powder in the upper discharge bin by a bin fluidizer to obtain fluidized slag powder;
  introducing the fluidized slag powder meeting quality concentration requirements into a gas-gas mixer (e.g., a gas-gas industrial mixer) through a dense phase discharge guide pipe;
  introducing pressurized $CO_2$-rich flue gas into the gas-gas mixer through a second flue gas pipeline; and mixing the fluidized slag powder with the pressurized $CO_2$-rich flue gas in the gas-gas mixer;
  mixing and intensifying the output from the gas-gas mixer in a secondary mixer to form a raw gas carrying flue gas and waste slag after instant cooling; and
  introducing the raw gas carrying flue gas and waste slag after instant cooling into a steel slag powder bin and a device for combined quenching, alkali removal and magnetic heat recovery treatment of converter slag.

As an optional embodiment, automatically replenishing pressurization air and supplementary air based on a pressure signal fed back from a bin pressure gauge of the upper discharge bin;
  collecting data of the amount of steel slag powder discharged per unit time from the upper discharge bin by a weighing signal collector of the upper discharge bin and transmitting the data to a control terminal; and automatically comparing the data with the data collected by a discharge weighing signal collector of the steel slag powder bin and judging the smoothness of the steel slag powder feeding and discharging.

In a third aspect of the present invention, there provided a slag quenching production line, comprising a system for delivering fluidized powder based on flue gas carrying waste slag and instant cooling steel slag according to the first aspect of the present invention.

The present invention has the following advantages over the prior art:
 1. The system and method for delivering fluidized powder based on flue gas carrying waste slag and instant cooling steel slag according to the present invention, wherein the delivery device for the fluidized powder based on flue gas carrying waste slag and instant cooling steel slag has features such as automatic feeding, continuous operation, primary ambient temperature high-pressure dense phase $CO_2$-rich flue gas conveyance, and secondary medium-temperature high-pressure dilute phase $CO_2$-rich flue gas conveyance, etc. In particular, the quenching medium is changed from $CO_2$-rich flue gas to a gas-solid two-phase quenching medium composed of waste gas carrying waste slag; the instant cooling process of liquid steel slag is changed from being dominated by forced convection heat transfer to solid conduction combined internal and external cooling, which increases the cooling capacity by 100 times. The crushing mechanism is changed from the conventional gas quenching dynamic force and surface tension to include the expansive cutting carrying solid waste slag particles, which increases the crushing precision by 1000 times. More importantly, carrying 1 kg of steel slag powder per unit time is equivalent to 4.6 kg of air, reducing the volume by 3.6 $m^3$, which greatly reduces the input energy consumption of quenching waste gas.
 2. The system and method for delivering fluidized powder based on flue gas carrying waste slag and instant cooling steel slag according to the present invention, the waste slag powder and the quenched slag product are homogeneous, but due to the rapid increase of cooling speed, the appearance of the quenched slag product changes from spherical to random irregular shape, which effectively enhances the strength of the interface transition zone with asphalt, and reduces the oil-stone ratio consumption; the waste slag acts as a cold core to rapidly instant cool the liquid slag, resulting in a fast temperature transition, which basically prevents the secondary decomposition of $C_3S$ into f-CaO and $C_2S$. In addition, the instant cooling process inhibits the crystal development, and the fine crystals store internal energy, which further enhances the activity of the quenched slag product.
 3. The system and method for delivering fluidized powder based on flue gas carrying waste slag and instant cooling steel slag according to the present invention, using the mixing of 80° C. flue gas from the steel plant itself, further ensures a good pneumatic conveying effect, adapts to the changes in the layout of the conveying pipeline and the appearance of elbows, and significantly improves the safety and reliability of the material delivery system.

Additional advantages of the present invention will be given in the following description, or will become apparent from the following description, or will be learned by practicing the present invention.

BRIEF DESCRIPTION OF THE DRAWINGS

The drawings accompanying the specification forming a part of this invention serve to provide a further understanding of the invention. The schematic embodiments of the invention and their description are used to explain the invention and do not constitute an improper limitation of the invention.

Figure 1:
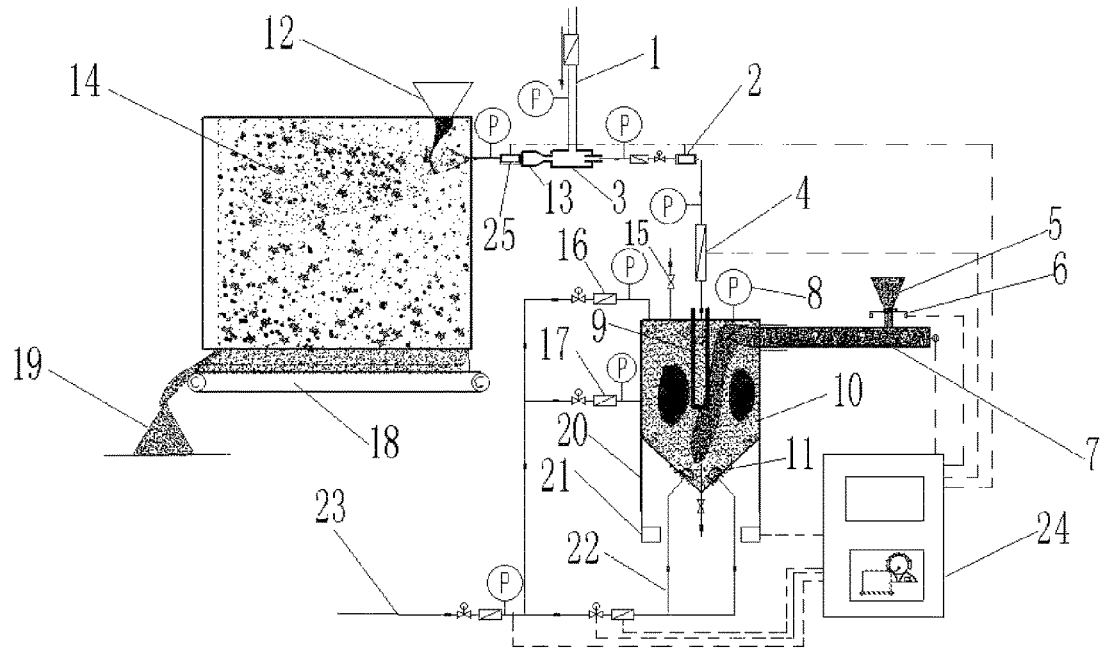
FIG. 1 is a schematic diagram of a structure of the system for delivering fluidized powder based on flue gas carrying waste slag and instant cooling steel slag provided by example 1 of the present invention.

wherein, 1. pressurized $CO_2$-rich flue gas for quenching; 2. first visual observation window; 3. gas-gas industrial mixer; 4. high-pressure dense phase gas-powder flow of ambient temperature $CO_2$-rich flue gas; 5. steel slag powder bin; 6. discharge weighing signal collector; 7. variable-pitch twin screw sealed conveyor; 8. bin pressure gauge; 9. dense phase discharge guide pipe; 10. upper discharge bin; 11. bin fluidizer; 12. liquid steel slag trough; 13. secondary mixer; 14. device for combined quenching, alkali removal and magnetic heat recovery treatment of converter slag; 15. vent valve; 16. pressurization air; 17. supplementary air; 18. double-layer air jet magnetic separation conveyor; 19. quenched slag product; 20. support frame of the upper discharge bin; 21. weighing signal collector of the upper discharge bin; 22. fluidization air; 23. ambient temperature fluidized $CO_2$-rich flue gas; 24. centralized control system; 25. second visual observation window.

DETAILED DESCRIPTION

The present invention will be further illustrated with reference to the drawings and embodiments.

It should be noted that the following detailed description is exemplary and is intended to provide further explanation of the present invention. Unless otherwise indicated, all technical and scientific terms used herein have the same meaning as commonly understood by those of ordinary skill in the art to which this invention belongs.

It should be noted that the terminology used herein is for the purpose of describing particular embodiments only and is not intended to be limiting of the present invention. As used herein, unless the context clearly indicates otherwise, the singular forms "a," "an" and "the" also include the plural forms. Additionally, it should be understood that when the term "comprising" and/or "including" is used in this specification, it specifies the presence of stated features, steps, operations, elements, components, and/or combinations thereof.

In the present invention, terms such as "upper", "lower", "left", "right", "front", "rear", "vertical", "horizontal", "side", "bottom", etc. indicating orientation or positional relationships are based on the orientation or positional relationships shown in the drawings for the convenience of describing the structural relationships of the various components or elements of the present invention, and are not specific to any component or element in the present invention. They should not be construed as limitations on the present invention.

In the present invention, terms such as "fixed", "connected", and "connection" etc. should be understood broadly, indicating that connection can be fixed connection, integral connection, or detachable connection; it can be direct connection, or indirect connection through an intermediate medium. Those skilled in the relevant scientific research or technical fields can determine the specific meanings of the above terms in the present invention according to specific conditions, rather than construing them as limitations on the present invention.

The examples and features of the examples in the present invention can be combined with each other without conflict.

Example 1

Figure 2:
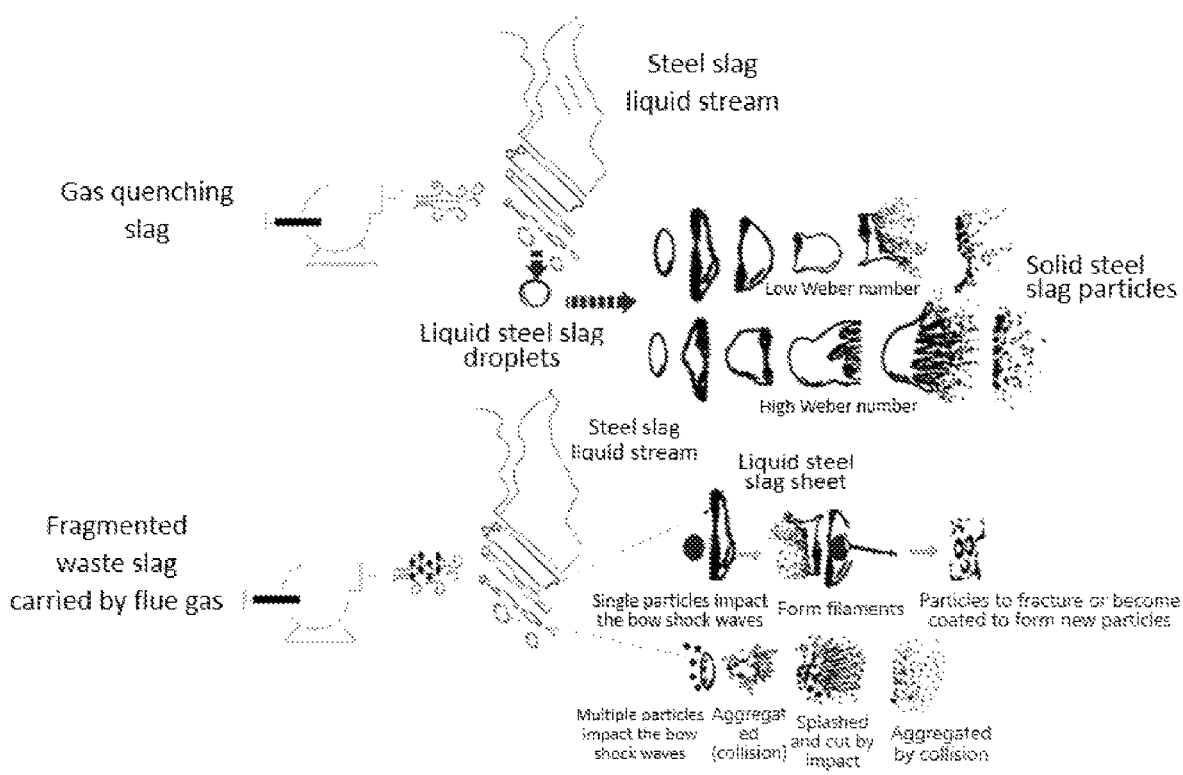
FIG. 2 is a schematic diagram of the mechanism changes of the conventional gas quenching process of steel slag and the quenching process of flue gas carrying waste slag provided by example 1 of the present invention.

As shown in FIG. 1 and FIG. 2, example 1 of the present invention provided a system for delivering fluidized powder based on flue gas carrying waste slag and instant cooling steel slag, comprising: a twin-screw waste slag powder conveyor, a first flue gas pipeline, a second flue gas pipeline, an upper discharge bin, a steel slag powder bin, and a device for combined quenching, alkali removal and magnetic heat recovery treatment of converter slag;

a first end of the first flue gas pipeline was configured to receive pressurized $CO_2$-rich flue gas for quenching (1), and a second end of the first flue gas pipeline was in fluid communication with a fluidization air pipeline, a pressurization air pipeline, and a supplementary air pipeline respectively; the fluidization air pipeline, the pressurization air pipeline, and the supplementary air pipeline were in fluid communication with the upper discharge bin (10) respectively;

a first end of the second flue gas pipeline was configured to receive ambient temperature fluidized $CO_2$-rich flue gas (23), and a second end of the second flue gas pipeline was in fluid communication with a gas-gas industrial mixer (3); a first end of a dense phase discharge guide pipe (9) was configured to extend into the upper discharge bin to receive high-pressure dense phase gas-powder flow of $CO_2$-rich flue gas, and a second end of the dense phase discharge guide pipe (9) was in fluid communication with the gas-gas industrial mixer (3);

the gas-gas industrial mixer (3) was in fluid communication with a secondary mixer (13), and the secondary mixer (13) was in communication with a steel slag powder bin (5) and a device (14) for combined quenching, alkali removal and magnetic heat recovery treatment of converter slag; a feeding end of a variable-pitch twin screw sealed conveyor (7) was configured to receive the steel slag powder from a discharge end of the steel slag powder bin (5), and a discharge end of the variable-pitch twin screw sealed conveyor (7) extended into an internal space of the upper discharge bin (10); the discharge end of the variable-pitch twin screw sealed conveyor (7) was equipped with an upwardly inclined gas-blocking segment, and an inside bottom of the upper discharge bin (10) was provided with a bin fluidizer.

In the example, the steel slag powder bin was provided with a discharge weighing signal collector (6), a support frame (20) of the upper discharge bin was connected to a weighing meter, the weighing meter was connected to a weighing signal collector (21) of the upper discharge bin, the discharge weighing signal collector (6) and the weighing signal collector (21) of the upper discharge bin were both in communication connection with a centralized control system (24) (i.e., control terminal).

In the example, a communication pipeline between the dense phase discharge guide pipe (9) and the gas-gas industrial mixer (3) was provided with at least one first visual observation window (2).

In the example, a communication pipeline between the secondary mixer and the steel slag powder bin and the device for combined quenching, alkali removal and magnetic heat recovery treatment of converter slag was provided with at least one second visual observation window (25).

It should be understood that, in some other embodiments, more visual observation windows can also be provided in other pipelines to achieve better process monitoring. Those skilled in the art can select and design according to specific conditions, which will not be repeated here.

In the example, a top of the steel slag powder bin and the device (14) for combined quenching, alkali removal and magnetic heat recovery treatment of converter slag was provided with a liquid steel slag trough (12); a double-layer air jet magnetic separation conveyor (18) was configured to receive a quenched slag product (19) output from the steel slag powder bin and a discharge port of the device (14) for combined quenching, alkali removal and magnetic heat recovery treatment of converter slag.

In the example, the upper discharge bin (10) was provided with a bin pressure gauge (8) in communication with the control terminal (24).

In the example, a top of the upper discharge bin (10) was opened with a through hole in communication with a vent line, the vent line was provided with a vent valve (15) in communication with the control terminal, in the example, each pipeline was provided with pressure sensors, flowmeters and electric valves.

In the example, the fluidization air pipeline was in fluid communication with a bottom of the upper discharge bin (10), the pressurization air pipeline was in fluid communication with a top of the upper discharge bin (10), and the supplementary air pipeline was in fluid communication with a middle or near-middle position of the upper discharge bin (10); the fluidization air pipeline was configured to introduce fluidization air (22); the pressurization air pipeline was configured to introduce pressurization air (16); the supplementary air pipeline was configured to introduce supplementary air (17); the ambient temperature fluidized $CO_2$-rich flue gas (23) provided the fluidization air (22), the pressurization air (16) and the supplementary air (17) in a metered proportion to ensure adequate fluidization state of the waste steel slag powder.

Example 2

Example 2 of the present invention provided a method for delivering fluidized powder based on flue gas carrying waste slag and instant cooling steel slag, using the system for delivering fluidized powder based on flue gas carrying waste slag and instant cooling steel slag described in example 1, comprising the following steps:
feeding waste slag powder (50 μm-70 μm) that met the requirements by a variable-pitch twin screw sealed conveyor (7); accumulating the waste slag powder at a gas-blocking segment and sealing a discharge end of the variable-pitch twin screw sealed conveyor (7); and falling the waste slag powder into an internal space of an upper discharge bin (10) under the extrusion of rear materials;

a lower part of the upper discharge bin (10) was provided with a bin fluidizer (11), which was connected to the $CO_2$-rich flue gas (0.5-1.0 MPa) discharged from the lime kiln in the plant area and fluidizes the waste slag powder in the bin.

fluidized slag powder (solid-gas ratio is 60200) that met the quality concentration requirements was conveyed by pipeline into a gas-gas industrial mixer (3);

the $CO_2$-rich flue gas from the lime kiln in the plant area was introduced and pressurized (0.5-1.0 MPa) then fed into the gas-gas industrial mixer (3) at a concentration ratio (solid-gas ratio is 30-80) where it was thoroughly mixed with the fluidized slag powder gas flow;

a secondary mixer (13) was arranged at the tail to intensify the mixing, forming a raw gas carrying flue gas and waste slag after instant cooling, which entered a liquid steel slag quenching chamber for operation.

More specifically, including the following processes:

By adjusting the amount of pressurization air, fluidization air, and supplementary air of $CO_2$-rich flue gas for quenching and fluidizing, as well as the opening of each air valve, the pressure inside the tank was kept constant to ensure the material entered a stable conveyance stage as quickly as possible. The pressure at important monitoring points remained basically unchanged to control the total conveyance pressure differential and maintained the discharge weight change curve of the discharge bin and steel slag storage bin to be approximately linear.

Based on the bed pressure drop and bed height change curve during the fluidization process, the particle fluidization characteristics, critical fluidization air velocity and fluidization pressure drop, etc. were determined, and the fluidization air amount, supplementary air amount and pressurization air amount were calculated;

the $CO_2$-rich flue gas was first split into two paths, one path was metered as ambient temperature fluidized $CO_2$-rich flue gas (23) and used as fluidization air (22), pressurization air (16) and supplementary air (17) separately, the other path was pressurized $CO_2$-rich flue gas for quenching which after passing through a flowmeter (1) was used as quenching air, forming a gas-solid two phase quenching medium together with the high-pressure dense phase gas-powder flow, entering the device (14) for combined quenching, alkali removal and magnetic heat recovery treatment of converter slag for instant cooling and quenching of the liquid steel slag.

The fluidization air (22), pressurization air (16), and supplementary air (17) were introduced into the bottom, top, and upper section of the upper discharge bin (10), respectively. Based on the pressure signal feedback from the bin pressure gauge (8), the supply amount of pressurization air (16) and supplementary air (17) was automatically controlled to maintain a relatively stable pressure level inside the upper discharge bin (10). An automatic vent valve (15) was installed at the top of the upper discharge bin (10) for pressure release during maintenance and other special depressurization needs.

The waste steel slag powder meeting particle size requirements fell from the steel slag powder bin (5) into the variable-pitch twin screw sealed conveyor (7), then materials in the gas-blocking segment were pressed by rear materials to fall into the upper discharge bin (10). The addition amount of the steel slag powder bin (5) was collected by the discharge weighing signal collector (6) and the data was sent to the centralized control system (24) (i.e., control terminal) after acquisition.

After being metered and controlled, the fluidization air (22) passed through multiple bin fluidizers (11) installed at the bottom of the upper discharge bin (10) to fluidize the steel slag powder inside the upper discharge bin (10), forming a high-pressure dense phase gas-powder flow (4) of ambient temperature $CO_2$-rich flue gas. This was conveyed through a dense phase discharge guide pipe (9) and pipework into the gas-gas industrial mixer (3).

The bottom of the upper discharge bin (10) was set up with a support frame (20) of the upper discharge bin and connected to a weighing meter. The weighing meter communicated with a weighing signal collector (21) of the upper discharge bin. The steel slag powder discharged per unit time from the upper discharge bin (10) was collected by the weighing signal collector (21) of the upper discharge bin after data acquisition and then sent to the centralized control system (24) (i.e., control terminal). It was automatically compared with the data from the discharge weighing signal collector (6) to determine the smoothness of the steel slag powder feeding and discharging;

the flow of gas powder inside the pipeline can be clearly observed through the transparent quartz glass tubes of the first visual observation window (2) and the second visual observation window (25) under the irradiation of a high-intensity light source. The signals of the local average velocity and concentration distribution of particles in the cross-section of the quartz glass tubes were transmitted to the centralized control system (24) (i.e., control terminal).

After the high-pressure dense phase gas-powder flow entered the gas-gas industrial mixer (3) and was thoroughly mixed with the pressurized $CO_2$-rich flue gas for quenching (1), and after being intensified by the secondary mixer (13), the mixed gas flow formed a secondary medium-temperature high-pressure dilute phase $CO_2$-rich flue gas conveyance. After being metered, the dilute phase $CO_2$-rich flue gas conveyance entered the device (14) for combined quenching, alkali removal and magnetic heat recovery treatment of converter slag.

The liquid steel slag discharged from converters, etc. was poured into the liquid steel slag trough (12) by slag ladles, and under gravity, formed a thin liquid slag stream flowing into the upper part of the device (14) for combined quenching, alkali removal and magnetic heat recovery treatment of converter slag. The $CO_2$-rich flue gas dilute phase gas-powder flow discharged from the secondary mixer (13) had intense contact with the liquid steel slag, forming high-pressure impact, segmentation, collision, and granulation on the liquid steel slag, as well as instant cooling high-temperature carbonation dealkalization. The steel slag was rapidly cooled and quenched to form the quenched slag product (19), which fell onto the double-layer air jet magnetic separation conveyor (18) and was discharged to the steel slag storage bin.

Example 3

Example 3 of the present invention provides a slag quenching production line, comprising the system for delivering fluidized powder based on flue gas carrying waste slag and instant cooling steel slag according to example 1 of the present invention.

The examples described above are merely preferred embodiments of the present invention and are not intended to limit the present invention. For those skilled in the art, various modifications and variations can be made to the present invention. Any modifications, equivalent substitutions, improvements, etc. made within the spirit and principle of the present invention shall fall within the protection scope of the present invention.

The invention claimed is:

1. A system for delivering fluidized powder based on flue gas carrying waste slag and instant cooling steel slag, comprising at least:
a variable-pitch twin screw sealed conveyor, a first flue gas pipeline, a second flue gas pipeline, an upper discharge bin, a steel slag powder bin and a device for combined quenching, alkali removal and magnetic heat recovery treatment of converter slag;
a first end of the first flue gas pipeline is configured to receive pressurized $CO_2$-rich flue gas, a second end of the first flue gas pipeline is in fluid communication with a fluidization air pipeline, a pressurization air pipeline, and a supplementary air pipeline respectively, the fluidization air pipeline, the pressurization air pipeline and the supplementary air pipeline are in fluid communication with the upper discharge bin respectively;
a first end of the second flue gas pipeline is configured to receive the pressurized $CO_2$-rich flue gas, a second end of the second flue gas pipeline is in fluid communication with a gas-gas mixer, a first end of a dense phase discharge guide pipe is configured to extend into the upper discharge bin to receive high-pressure dense phase gas-powder flow of $CO_2$-rich flue gas, and a second end of the dense phase discharge guide pipe is in fluid communication with the gas-gas mixer;
the gas-gas mixer is in fluid communication with a secondary mixer; the secondary mixer is in fluid communication with the device for combined quenching, alkali removal and magnetic heat recovery treatment of converter slag; a feeding end of the variable-pitch twin screw sealed conveyor is configured to receive steel slag powder from a discharge end of the steel slag powder bin; a discharge end of the variable-pitch twin screw sealed conveyor is configured to extend into an internal space of the upper discharge bin; the discharge end of the variable-pitch twin screw sealed conveyor is equipped with an upwardly inclined gas-blocking segment, and an inside bottom of the upper discharge bin is provided with a bin fluidizer.

2. The system according to claim 1, wherein:
the steel slag powder bin is provided with a discharge weighing signal collector, a support frame of the upper discharge bin is connected to a weighing meter, the weighing meter is connected to a weighing signal collector of the upper discharge bin, the discharge weighing signal collector and the weighing signal collector of the upper discharge bin are both in communication connection with a control terminal.

3. The system according to claim 1, wherein:
a communication pipeline between the dense phase discharge guide pipe and the gas-gas mixer is provided with at least one first visual observation window;
a communication pipeline between the secondary mixer and the device for combined quenching, alkali removal and magnetic heat recovery treatment of converter slag is provided with at least one second visual observation window.

4. The system according to claim 1, wherein:
a top of the device for combined quenching, alkali removal and magnetic heat recovery treatment of converter slag is provided with a liquid steel slag trough; a double-layer air jet magnetic separation conveyor is configured to receive a quenched slag product output from a discharge port of the device for combined quenching, alkali removal and magnetic heat recovery treatment of converter slag.

5. The system according to claim 1, wherein:
the upper discharge bin is provided with a bin pressure gauge in communication with the control terminal.

6. The system according to claim 1, wherein:
a top of the upper discharge bin is opened with a through hole in communication with a vent line, the vent line is provided with a vent valve in communication with the control terminal, each pipeline is provided with pressure sensors, flowmeters, and electric valves.

7. The system according to claim 1, wherein:
the fluidization air pipeline is in fluid communication with a bottom of the upper discharge bin, the pressurization air pipeline is in fluid communication with the top of the upper discharge bin, and the supplementary air pipeline is in fluid communication with a middle or near-middle position of the upper discharge bin.

8. A slag quenching production line, comprising a system for delivering fluidized powder based on flue gas carrying waste slag and instant cooling steel slag according to claim 1.

9. A method for delivering fluidized powder based on flue gas carrying waste slag and instant cooling steel slag, using a system for delivering fluidized powder based on flue gas carrying waste slag and instant cooling steel slag according to claim 1, comprising:
feeding waste slag powder that meets the requirements by a variable-pitch twin screw sealed conveyor; accumulating the waste slag powder at a gas-blocking segment and sealing a discharge end of the variable-pitch twin screw sealed conveyor; and falling the waste slag powder into an internal space of an upper discharge bin under the extrusion of rear materials;
introducing pressurized $CO_2$-rich flue gas into the upper discharge bin via a first flue gas pipeline, a fluidization air pipeline, a pressurization air pipeline and a supplementary air pipeline; fluidizing the waste slag powder in the upper discharge bin by a bin fluidizer to obtain fluidized slag powder;
introducing the fluidized slag powder meeting quality concentration requirements into a gas-gas mixer through a dense phase discharge guide pipe;
introducing the pressurized $CO_2$-rich flue gas into the gas-gas mixer through a second flue gas pipeline; and mixing the fluidized slag powder with the pressurized $CO_2$-rich flue gas in the gas-gas mixer;
mixing and intensifying the output from the gas-gas mixer in a secondary mixer to form a raw gas carrying flue gas and waste slag after instant cooling; and
introducing the raw gas carrying flue gas and waste slag after instant cooling into a device for combined quenching, alkali removal and magnetic heat recovery treatment of converter slag.

10. The method according to claim 9, wherein:
automatically replenishing pressurized air and supplementary air based on a pressure signal fed back from a bin pressure gauge of the upper discharge bin;
collecting data of the amount of steel slag powder discharged per unit time from the upper discharge bin by a weighing signal collector of the upper discharge bin and transmitting the data to a control terminal; and automatically comparing the data with the data collected by a discharge weighing signal collector of the steel slag powder bin and judging the smoothness of the steel slag powder feeding and discharging.

\* \* \* \* \*